United States Patent
Ratasuk et al.

(10) Patent No.: US 9,432,159 B2
(45) Date of Patent: Aug. 30, 2016

(54) METHOD, APPARATUS AND COMPUTER PROGRAM FOR PROVIDING SOUNDING REFERENCE SIGNALS FOR COORDINATED MULTIPOINT TRANSMISSIONS

(71) Applicant: NOKIA SOLUTIONS AND NETWORKS OY, Espoo (FI)

(72) Inventors: Rapeepat Ratasuk, Hoffman Estates, IL (US); Weidong Yang, Hoffman Estates, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 77 days.

(21) Appl. No.: 14/365,344

(22) PCT Filed: Dec. 17, 2012

(86) PCT No.: PCT/EP2012/075732
§ 371 (c)(1),
(2) Date: Jun. 13, 2014

(87) PCT Pub. No.: WO2013/092469
PCT Pub. Date: Jun. 27, 2013

(65) Prior Publication Data
US 2014/0348100 A1    Nov. 27, 2014

Related U.S. Application Data

(60) Provisional application No. 61/578,531, filed on Dec. 21, 2011.

(51) Int. Cl.
*H04L 5/00*    (2006.01)
*H04W 72/12*    (2009.01)
(Continued)

(52) U.S. Cl.
CPC ............ *H04L 5/0035* (2013.01); *H04B 7/024* (2013.01); *H04L 5/0048* (2013.01); *H04W 72/1226* (2013.01); *H04L 5/0053* (2013.01);
(Continued)

(58) Field of Classification Search
None
See application file for complete search history.

(56) References Cited

U.S. PATENT DOCUMENTS

2010/0056215 A1*  3/2010  Gorokhov ............ H04B 7/024
                                              455/561
2011/0034175 A1*  2/2011  Fong .................. H04B 7/024
                                              455/450

(Continued)

FOREIGN PATENT DOCUMENTS

SE  WO 2011139189 A1 *  11/2011 ........... H04B 7/0417
WO  WO 2010/124241 A2    10/2010
(Continued)

OTHER PUBLICATIONS

International Search Report dated Mar. 27, 2013 corresponding to International Patent Application No. PCT/EP2012/075732.
(Continued)

*Primary Examiner* — Ayaz Sheikh
*Assistant Examiner* — Tarell Hampton
(74) *Attorney, Agent, or Firm* — Squire Patton Boggs (US) LLP

(57) ABSTRACT

A method comprising: sending, from a first access point, a scheduling assignment to a first user equipment at a first time; receiving, at the first access point, a reference signal transmission from the first user equipment at a second time; and sending, from the first access point, a downlink data packet transmission to the first user equipment at a third time.

18 Claims, 9 Drawing Sheets

(51) Int. Cl.
  *H04B 7/02* (2006.01)
  *H04W 88/08* (2009.01)
(52) U.S. Cl.
  CPC ........... *H04L 5/0073* (2013.01); *H04W 88/08* (2013.01); *H04W 88/085* (2013.01)

(56) References Cited

U.S. PATENT DOCUMENTS

| | | | | |
|---|---|---|---|---|
| 2011/0170496 | A1* | 7/2011 | Fong | H04L 5/0053 370/329 |
| 2011/0206106 | A1* | 8/2011 | Mallik | H04B 7/024 375/226 |
| 2011/0207415 | A1* | 8/2011 | Luo | H04B 7/0413 455/68 |
| 2011/0275382 | A1* | 11/2011 | Hakola | H04W 24/10 455/452.2 |
| 2011/0294529 | A1* | 12/2011 | Luo | H04L 5/0048 455/509 |
| 2011/0306347 | A1* | 12/2011 | Choi | H04W 36/04 455/438 |
| 2011/0310818 | A1* | 12/2011 | Lin | H04W 72/042 370/329 |
| 2012/0014330 | A1* | 1/2012 | Damnjanovic | H04L 5/001 370/329 |
| 2012/0057535 | A1* | 3/2012 | Zhang | H04W 72/0426 370/329 |
| 2012/0113950 | A1* | 5/2012 | Skov | H04L 5/0016 370/329 |
| 2012/0149426 | A1* | 6/2012 | Nakamura | G01S 5/0215 455/522 |
| 2012/0294249 | A1* | 11/2012 | Yu | H04B 7/024 370/329 |
| 2013/0083729 | A1* | 4/2013 | Xu | H04W 52/325 370/328 |
| 2013/0114431 | A1* | 5/2013 | Koivisto | H04B 7/024 370/252 |
| 2013/0288738 | A1* | 10/2013 | Takeda | H04L 1/1825 455/522 |
| 2013/0322323 | A1* | 12/2013 | Kim | H04W 72/082 370/315 |
| 2013/0343317 | A1* | 12/2013 | Etemad | H04B 7/024 370/329 |
| 2014/0369286 | A1* | 12/2014 | Noh | H04W 72/1289 370/329 |

FOREIGN PATENT DOCUMENTS

| | | | |
|---|---|---|---|
| WO | WO 2010124241 A2 * | 10/2010 | ............. H04B 7/024 |
| WO | WO 2011/009486 A1 | 1/2011 | |

OTHER PUBLICATIONS

Motorola: "On Remaining details of dynamic aperiodic SRS triggering," 3GPP Draft; 3GPP TSG RAN WG1 Meeting #63, R1-106291, Jacksonville, USA, Nov. 15-19, 2010, XP050468230, pp. 1-5.

3GPP TS 36.300 V8.12.0 (Mar. 2010) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

3GPP TS 36.300 V9.8.0 (Sep. 2011) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)

3GPP TS 36.300 V10.5.0 (Sep. 2011) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

3GPP TR 36.913 V8.0.1 (Mar. 2009) 3rd Generation Partnership Project; Technical Specification Group Radio Access Network; Requirements for further advancements for Evolved Universal Terrestrial Radio Access (E-UTRA) (LTE-Advanced) (Release 8).

3GPP TR 36.913 V9.0.0 (Dec. 2009) 3rd Generation Partnership Project; Technical Specification Group Radio Access Network; Requirements for further advancements for Evolved Universal Terrestrial Radio Access (E-UTRA) (LTE-Advanced) (Release 9).

3GPP TR 36.913 V10.0.0 (Mar. 2011) 3rd Generation Partnership Project; Technical Specification Group Radio Access Network; Requirements for further advancements for Evolved Universal Terrestrial Radio Access (E-UTRA) (LTE-Advanced) (Release 10).

R1-105544 3GPP TSG RAN WG1 Meeting #62bis Xi'an, PR China, Oct. 11-15, 2010: Nokia Siemens Networks, Nokia "Channel sounding enhancements for LTE-Advanced".

* cited by examiner

METHOD, APPARATUS AND COMPUTER PROGRAM FOR PROVIDING SOUNDING REFERENCE SIGNALS FOR COORDINATED MULTIPOINT TRANSMISSIONS

TECHNICAL FIELD

The exemplary and non-limiting embodiments of this invention relate generally to wireless communication systems, methods, devices and computer programs and, more specifically, relate to providing sounding reference signals for coordinated multipoint transmissions.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
  3GPP third generation partnership project
  BW bandwidth
  CB coordinated beamforming
  CC component carrier
  CDM code division multiplexing
  CoMP coordinated multipoint
  CQI channel quality indication
  CSI channel state information
  DL downlink (eNB towards UE)
  DM RS demodulation reference signal
  eNB E-UTRAN Node B (evolved Node B)
  EPC evolved packet core
  ePDCCH enhanced physical downlink control channel
  E-UTRAN evolved UTRAN (LTE)
  HARQ hybrid automatic repeat request
  IMT-A international mobile telephony-advanced
  ICIC inter-cell interference coordination
  ITU international telecommunication union
  ITU-R ITU radiocommunication sector
  LTE long term evolution of UTRAN (E-UTRAN)
  MAC medium access control (layer 2, L2)
  MCS Modulation and Coding Scheme
  MM/MME mobility management/mobility management entity
  Node B base station
  OAM operations and maintenance
  OFDMA orthogonal frequency division multiple access
  PDCCH physical downlink control channel
  PDCP packet data convergence protocol
  PHY physical (layer 1, L1)
  PMI precoding matrix indicator
  RB resource block
  RLC radio link control
  RRC radio resource control
  RRM radio resource management
  SC-FDMA single carrier, frequency division multiple access
  S-GW serving gateway
  SRS sounding reference signal
  TDD time domain duplex
  UE user equipment, such as a mobile station or mobile terminal
  UL uplink (UE towards eNB)
  UTRAN universal terrestrial radio access network One specification of interest is 3GPP TS 36.300, V8.12.0 (2010-04), "3rd Generation Partnership Project; Technical Specification Group Radio Access Network; Evolved Universal Terrestrial Radio Access (E UTRA) and Evolved Universal Terrestrial Access Network (E UTRAN); Overall description; Stage 2 (Release 8)," incorporated by reference herein in its entirety. This system may be referred to for convenience as LTE Rel-8 (which also contains 3G HSPA and its improvements). In general, the set of specifications given generally as 3GPP TS 36.xyz (e.g., 36.211, 36.311, 36.312, etc.) may be seen as describing the Release 8 (Rel-8) LTE system. More recently, Release 9 (Rel-9) versions of at least some of these specifications have been published including 3GPP TS 36.300, V9.8.0 (2011-10), incorporated by reference herein in its entirety. Even more recently, Release 10 (Rel-10) versions of at least some of these specifications have been published including 3GPP TS 36.300, V10.5.0 (2011-10), incorporated by reference herein in its entirety.

FIG. 1 shows the overall architecture of the E-UTRAN system. The E-UTRAN system includes eNBs 2, 3 and 4, providing the E-UTRA user plane (PDCP/RLC/MAC/PHY) and control plane (RRC) protocol terminations towards the UE (not shown). The eNBs 2, 3 and 4 are interconnected with each other by means of an X2 interface. The eNBs 2, 3 and 4 are also connected by means of an S1 interface to an EPC, more specifically to a MME (Mobility Management Entity) by means of a S1 MME interface and to a Serving Gateway (SGW) by means of a S1 interface. FIG. 1 shows a first MME/S-GW 5 and a second MME-S-GW 6. It should be appreciated that the MME may be a separate entity from the S-GW. The S1 interface supports a many-to-many relationship between MMEs/S-GW and eNBs.

The eNB hosts the following functions:
  functions for RRM: Radio Bearer Control, Radio Admission Control, Connection Mobility Control, Dynamic allocation of resources to UEs in both UL and DL (scheduling);
  IP header compression and encryption of the user data stream;
  selection of a MME at UE attachment;
  routing of User Plane data towards the Serving Gateway;
  scheduling and transmission of paging messages (originated from the MME);
  scheduling and transmission of broadcast information (originated from the MME or OandM); and
  a measurement and measurement reporting configuration for mobility and scheduling.

Of particular interest herein are the further releases of 3GPP LTE (e.g., LTE Rel-10) targeted towards future IMT-A systems, referred to herein for convenience simply as LTE-Advanced (LTE-A). Reference in this regard may be made to 3GPP TR 36.913, V8.0.1 (2009-03), 3rd Generation Partnership Project; Technical Specification Group Radio Access Network; Requirements for Further Advancements for E UTRA (LTE-Advanced) (Release 8), incorporated by reference herein in its entirety. A goal of LTE-A is to provide significantly enhanced services by means of higher data rates and lower latency with reduced cost. Reference is further made to a Release 9 version of 3GPP TR 36.913, V9.0.0 (2009-12), incorporated by reference herein in its entirety. Reference is also made to a Release 10 version of 3GPP TR 36.913, V10.0.0 (2011-06), incorporated by reference herein in its entirety.

In downlink (DL) coordinated multi-point (CoMP) design, the achieved gain is typically associated with a high requirement on feedback from a UE (e.g., channel state information (CSI), channel quality indication (CQI), etc.). One option is to provide subband precoding matrix indicator and CQI with a high feedback rate; however, this uses a large uplink (UL) overhead.

The achieved gain may also be associated with frequency/time synchronization among multiple transmission points. One approach to improve gain is to require high frequency/time synchronization requirements. Few existing systems may be able to accommodate these demands. Additionally, systems that can meet the high frequency/time synchronization requirements may be very expensive. Another approach is to limit downlink (DL) CoMP to scenarios where highly accurate frequency/time synchronization can be achieved; however, this severely limits number of cases where DL CoMP can be used.

For CoMP operations, typically tight coupling between eNBs is assumed. For example, baseband pooling and fast broadband fiber connections may exist among multiple eNBs. Also, the cells joined in CoMP transmission may either share the same time/frequency reference bases through a shared local oscillator (as in the case of intra-site CoMP), or highly accurate time/frequency reference bases are made available to the involved cells (as in the case of inter-site CoMP). In addition, for inter-site CoMP, calibration is also assumed for the involved cells. The typical network architecture for CoMP also implies that CoMP is normally enabled on equipments from a single vendor in the deployed network as the required tight coupling is rather difficult to achieve in a multi-vendor deployment environment. It also implies substantial modification to the network connections and network nodes (eNB) transitioning from single-cell operation to CoMP operation. With all the above listed constraints, the applicable scenarios for CoMP operations is severely limited by implementation cost, implied network architecture, vendor-sourcing restriction, network upgrade complications and deployment scenarios.

In CoMP operations, not only the channel information from a UE's home cell, but also that from other cells are needed to make decision on the transmission to one or more UEs. Downlink CQI/CSI feedback and uplink sounding can be used to acquire the needed channel information. As mentioned above, in a network with tightly coupled eNBs, the channel state information can be shared among all eNBs. Thus, scheduling decisions, transmit weight design, power allocation, MCS selection, etc. can be determined jointly or in a coordinated way among the eNBs. Given the substantial CoMP gain available and the associated implementation constraints, it is beneficial to exploit the possibilities with CoMP operations without the associated implementation constraints. If CoMP operations are enabled for eNBs that are loosely coupled, then the applicable scenarios for CoMP operations can be greatly enlarged and many thorny implementation issues can be avoided. Additionally, it will be easier to deploy with equipments from multiple vendors.

The status of using SRS to obtain channel information is reviewed below.

Periodic sounding reference signals (SRS) have been specified in Rel-8/9. UE transmission of SRS can take place at a configured periodicity over configured subbands. The SRS transmission can be sub-band or wideband and be with or without hopping. However, this use is intended for a UE's home or serving cell in uplink frequency selective scheduling, downlink frequency scheduling, PMI selection and/or beamforming weight design in a TDD system.

In Rel 10, aperiodic SRS is introduced to solve the multiplexing capability issue and providing more timely channel state information (CSI). In this case, the UE is requested to send the SRS only at the command of the eNB instead of at periodic intervals. This reduces SRS overhead and allows more UEs to share the same SRS resource. In addition, the eNB can request SRS transmission just prior to scheduling the UE for data transmission, thus acquiring more accurate channel state information. This aperiodic SRS can be triggered by an uplink grant or downlink assignment in TDD. However the SRS transmission is still intended for use only in the home cell.

It may be possible that SRS transmissions from a given access point can be detected through a SRS correlator in other access points. This can provide valuable channel state information of a particular UE to the other access points for the purpose of interference avoidance or nulling. However, except in rare cases with extreme UE distribution/traffic type, the downlink transmission in a LTE access point does not persistently go to one UE. Thus, the spatial information captured in other access points cannot be blindly applied for downlink transmission weight design in each of those access points. This is because the eNB cannot assume that the UE whose SRS transmission was detected will indeed be the same UE being scheduled in the downlink.

If a centralized scheduler or channel state information (CSI) concentrator/distributor exists in the network, the CSI information captured in each access point may be given labels for those access points and their timing. A super-eNB may have a physical limit that put constraints on the network architecture. Consequently, Rel-8/9/10 SRS does not provide a satisfactory solution to Rel-11 CoMP design.

Additional techniques used to attempt to improve CoMP design include increasing SRS capacity and providing SRS for each transmission antenna. Another technique is to use an uplink grant or a downlink assignment to trigger SRS transmissions. However, there remains a need to improve SRS configuration and control design and to provide fresh channel information to multiple access points.

It should be understood in the LTE specifications, SRS and physical random access channel (PRACH) signals share some similarities between them: they are both generated from Zadoff-Chu sequences, and also multiplexing through cyclic shifts and different root sequences are possible. From this, it should be understood that the PRACH signal can also be used as a sounding signal. The description below equally applies to PRACH.

In a first aspect there is provided a method comprising: sending, from a first access point, a scheduling assignment to a first user equipment at a first time; receiving, at the first access point, a reference signal transmission from the first user equipment at a second time; and sending, from the first access point, a downlink data packet transmission to the first user equipment at a third time.

Preferably the method further comprises: estimating, at a second access point at the second time, reference signal resources, over which the reference signal transmission from the first user equipment in the first access point is transmitted, where the reference signal transmission is associated with the downlink data packet transmission from the first access point at the third time; and choosing a transmission strategy for use at the third time based at least in part on the estimated reference signal resources.

Preferably the downlink data packet transmission at the third time is a coordinated multipoint transmission.

Preferably, where, in coordinated beamforming coordinated multipoint transmission, the received reference signal transmission is used to one of:
design a downlink transmit weight and choose a precoder from a codebook.

Preferably, where, in dynamic access point selection coordinated multipoint transmission, the reference signal transmission is used in coordination with reference signal reception at other access points in a coordinated multipoint transmission set to choose a transmission access point to serve at least one other user equipment at the third time.

Preferably, where, in dynamic blanking coordinated multipoint transmission, the reference signal transmission is used in coordination with reference signal reception at other access points in a coordinated multipoint transmission set to determine whether the second access point should transmit to at least one other user equipment at the third time, where the coordinated multipoint transmission set comprises the second access point.

Preferably the second reference signal transmission is used to design beamforming weights.

Preferably the beamforming weights generate spatial nulling in a direction towards the first user equipment.

Preferably a bandwidth of the reference signal transmission is equal to a bandwidth of a downlink radio barrier.

Preferably the receiving comprises separating the reference signal transmission using a transmission comb.

Preferably reference signal transmissions from user equipment associated with the first access point use a first finger in the transmission comb and reference signal transmissions from user equipment not associated with the first access point use a second finger in the transmission comb.

Preferably reference signal transmissions from user equipment associated with the first access point use a first time and/or frequency region and reference signal transmissions from user equipment not associated with the first access point use a second time and/or frequency region.

Preferably the method further comprises sending, from the first access point to a second access point, reference signal power information and a cyclic shift for the reference signal.

Preferably the method further comprises: determining whether to cancel the scheduling assignment; and in response to determining to cancel the scheduling assignment, informing the first user equipment that the scheduling assignment has been canceled.

Preferably the reference signal comprises a sounding reference signal.

Alternatively the reference signal comprises a physical random access channel signal.

In a second aspect there is provided a computer program product comprising computer executable instructions which when run on one or more processors perform: sending a scheduling assignment to a first user equipment at a first time; receiving a reference signal transmission from the first user equipment at a second time; and sending a downlink data packet transmission to the first user equipment at a third time.

Preferably the reference signal transmission from the first user equipment is a first reference signal transmission, and the actions further comprise: estimating, at the second time, reference signal resources, over which a second reference signal transmission from a second user equipment associated with a second access point is received, where the second reference signal transmission is associated with a second downlink data packet transmission from a second access point at the third time; and choosing a transmission strategy for use at the third time based at least in part on the estimated reference signal resources.

Preferably the downlink data packet transmission at the third time is a coordinated multipoint transmission.

Preferably, where, in coordinated beamforming coordinated multipoint transmission, the received reference signal transmission is used to one of:
design a downlink transmit weight and choose a precoder from a codebook.

Preferably, where, in dynamic access point selection coordinated multipoint transmission, the reference signal transmission is used in coordination with reference signal reception at other access points in a coordinated multipoint transmission set to choose a transmission access point to serve at least one other user equipment at the third time.

Preferably, where, in dynamic blanking coordinated multipoint transmission, the reference signal transmission is used in coordination with reference signal reception at other access points in a coordinated multipoint transmission set to determine whether the second access point should transmit to at least one other user equipment at the third time, where the coordinated multipoint transmission set comprises the second access point.

Preferably the actions further comprise designing beamforming weights based on the second reference signal transmission.

Preferably the beamforming weights generate spatial nulling in a direction towards the first user equipment.

Preferably a bandwidth of the reference signal transmission is equal to a bandwidth of a downlink radio barrier.

Preferably the receiving comprises separating the reference signal transmission using a transmission comb.

Preferably reference signal transmissions from user equipment associated with the first access point use a first finger in the transmission comb and reference signal transmissions from user equipment not associated with the first access point use a second finger in the transmission comb.

Preferably reference signal transmissions from user equipment associated with the first access point use a first time and/or frequency region and reference signal transmissions from user equipment not associated with the first access point use a second time and/or frequency region.

Preferably the actions further comprise sending, to a second access point, reference signal power information and a cyclic shift for the reference signal.

Preferably the actions further comprise: determining whether to cancel the scheduling assignment; and in response to determining to cancel the scheduling assignment, informing the first user equipment that the scheduling assignment has been canceled.

Preferably the computer program product is embodied on a computer readable medium.

Preferably the reference signal comprises a sounding reference signal.

Alternatively the reference signal comprises a physical random access channel signal.

In a third aspect there is provided an apparatus comprising at least one processor; and at least one memory including computer program code, the at least one memory and the computer program code configured to, with the at least one processor, cause the apparatus to perform at least the following: to send a scheduling assignment to a first user equipment at a first time; to receive a first reference signal transmission from the first user equipment at a second time; and to send a first downlink data packet transmission to the first user equipment at a third time.

Preferably the at least one memory and the computer program code are further configured to cause the apparatus: to estimate, at the second time, reference signal resources, over which a second reference signal transmission from a second user equipment associated with a second access point is received, where the second reference signal transmission is associated with a second downlink data packet transmission from a second apparatus at the third time; and to choose a transmission strategy for use at the third time based at least in part on the estimated reference signal resources.

Preferably the second downlink data packet transmission at the third time is a coordinated multipoint transmission.

Preferably in coordinated beamforming coordinated multipoint transmission, the second reference signal transmission is used to one of: design a downlink transmit weight and choose a precoder from a codebook.

Preferably the at least one memory and the computer program code are further configured to cause the apparatus to design beamforming weights based on the second reference signal transmission.

Preferably the beamforming weights generate spatial nulling in a direction towards the second user equipment.

Preferably a bandwidth of the first reference signal transmission is equal to a bandwidth of a downlink radio barrier.

Preferably, when receiving the reference signal transmission, the at least one memory and the computer program code are further configured to cause the apparatus to separate the first reference signal transmission using a transmission comb.

Preferably reference signal transmissions from user equipment associated with the first access point use a first finger in the transmission comb and reference signal transmissions from user equipment not associated with the first access point use a second finger in the transmission comb.

Preferably reference signal transmissions from user equipment associated with the first access point use a first time and/or frequency region and reference signal transmissions from user equipment not associated with the first access point use a second time and/or frequency region.

Preferably the at least one memory and the computer program code are further configured to cause the apparatus to send, to a second access point, reference signal power information and a cyclic shift for the first reference signal.

Preferably the at least one memory and the computer program code are further configured to cause the apparatus: to determine whether to cancel the scheduling assignment; and in response to determining to cancel the scheduling assignment, to inform the first user equipment that the scheduling assignment has been canceled.

Preferably the apparatus comprises an access point.

Alternatively the apparatus comprises a base station.

Preferably the reference signal comprises a sounding reference signal.

Alternatively the reference signal comprises a physical random access channel signal.

In a fourth aspect there is provided an apparatus comprising: means for sending a scheduling assignment to a first user equipment at a first time; means for receiving a reference signal transmission from the first user equipment at a second time; and means for sending a downlink data packet transmission to the first user equipment at a third time.

Preferably the reference signal transmission from the first user equipment is a first reference signal transmission, and the apparatus further comprises: means for estimating, at the second time, reference signal resources, over which a second reference signal transmission from a second user equipment associated with a second access point is received, where the second reference signal transmission is associated with a second downlink data packet transmission from a second access point at the third time; and means for choosing a transmission strategy for use at the third time based at least in part on the estimated reference signal resources.

Preferably the downlink data packet transmission at the third time is a coordinated multipoint transmission.

Preferably, where, in coordinated beamforming coordinated multipoint transmission, the received reference signal transmission is used to one of: design a downlink transmit weight and choose a precoder from a codebook.

Preferably, where, in dynamic access point selection coordinated multipoint transmission, the reference signal transmission is used in coordination with reference signal reception at other access points in a coordinated multipoint transmission set to choose a transmission access point to serve at least one other user equipment at the third time.

Preferably, where, in dynamic blanking coordinated multipoint transmission, the reference signal transmission is used in coordination with reference signal reception at other access points in a coordinated multipoint transmission set to determine whether the second access point should transmit to at least one other user equipment at the third time, where the coordinated multipoint transmission set comprises the second access point.

Preferably the apparatus further comprises means for designing beamforming weights based on the second reference signal transmission.

Preferably the beamforming weights generate spatial nulling in a direction towards the first user equipment.

Preferably a bandwidth of the reference signal transmission is equal to a bandwidth of a downlink radio barrier.

Preferably the receiving means comprise means for separating the reference signal transmission using a transmission comb.

Preferably reference signal transmissions from user equipment associated with the first access point use a first finger in the transmission comb and reference signal transmissions from user equipment not associated with the first access point use a second finger in the transmission comb.

Preferably reference signal transmissions from user equipment associated with the first access point use a first time and/or frequency region and reference signal transmissions from user equipment not associated with the first access point use a second time and/or frequency region.

Preferably the apparatus further comprises means for sending, to a second access point, reference signal power information and a cyclic shift for the reference signal.

Preferably the apparatus further comprises: means for determining whether to cancel the scheduling assignment; and means for informing the first user equipment that the scheduling assignment has been canceled in response to determining to cancel the scheduling assignment.

Preferably the reference signal comprises a sounding reference signal.

Alternatively the reference signal comprises a physical random access channel signal.

DETAILED DESCRIPTION

Various exemplary embodiments in accordance with this invention provide a SRS correlator for multiple SRS sequences. The SRS sequences may be built at each access point. For example, when the SRS transmission is over one OFDMA symbol, the correlation may be performed after FFT processing. By providing deterministic timing relationship between channel sounding and downlink transmission, each access point can independently perform nulling (without using low latency coordination with other access points). The coordination of SRS resources can be done at a slow rate and that liberates the CoMP network from rigid architecture requirements.

Figure 2:
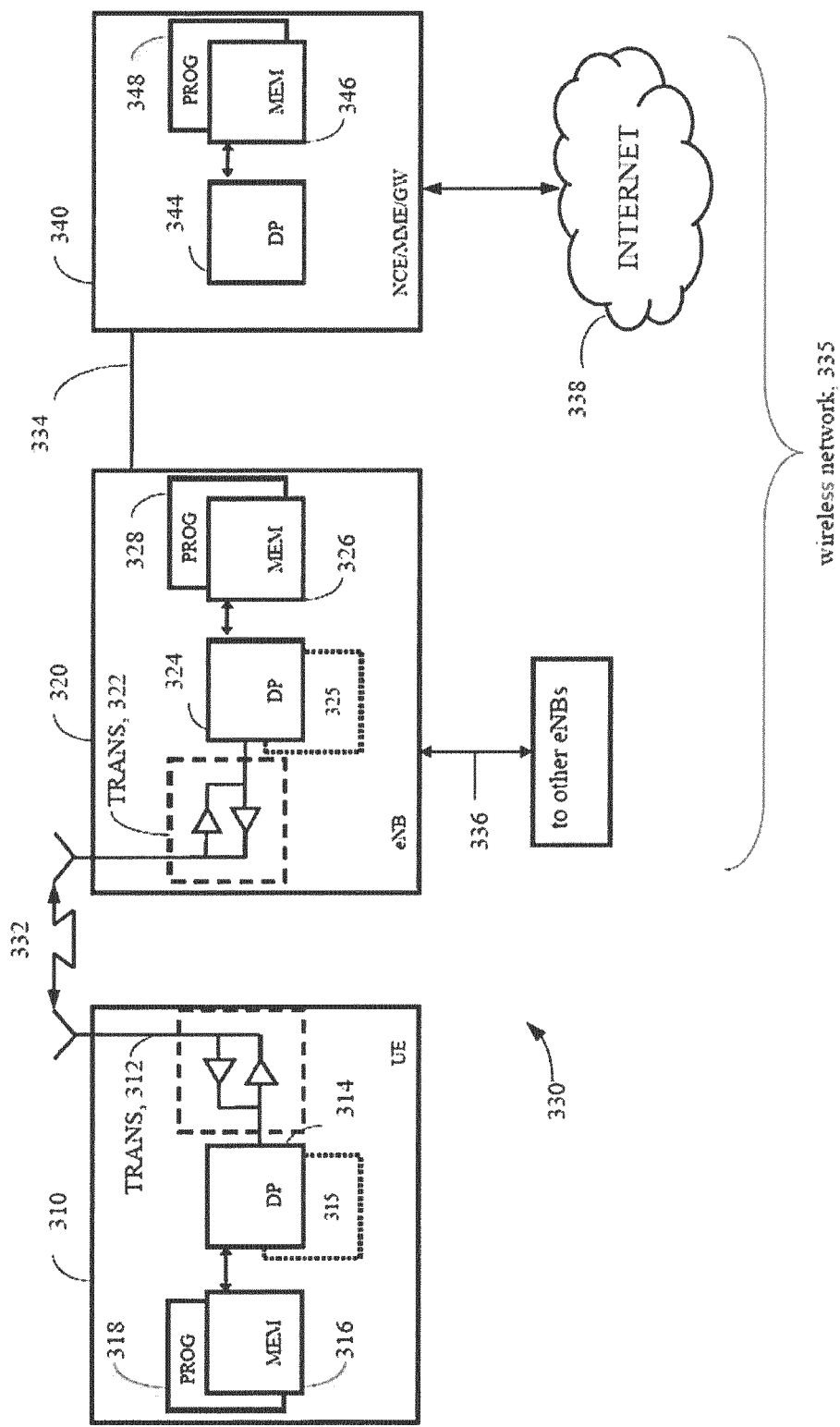
FIG. 2 shows a simplified block diagram of exemplary electronic devices that are suitable for use in practicing various exemplary embodiments of this invention.

Before describing in further detail various exemplary embodiments of this invention, reference is made to FIG. 2 for illustrating a simplified block diagram of various electronic devices and apparatus that are suitable for use in practicing exemplary embodiments of this invention.

Figure 1:
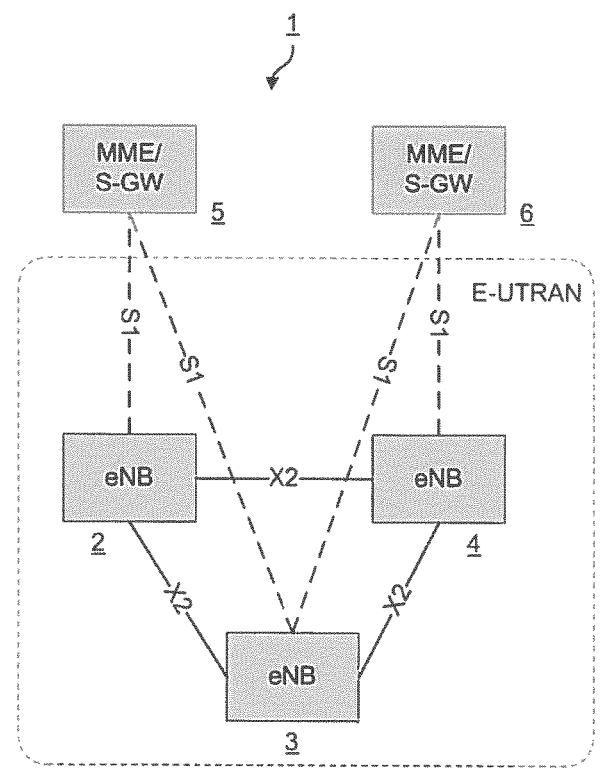
FIG. 1 shows the overall architecture of the E UTRAN system.

In the wireless system 330 of FIG. 2, a wireless network 335 is adapted for communication over a wireless link 332 with an apparatus, such as a mobile communication device which may be referred to as a UE 310, via a network access point, such as a Node B (base station), and more specifically an eNB 320. The network 335 may include a network control element (NCE) 340 that may include the MME/SGW functionality shown in FIG. 1, and which provides connectivity with a network, such as a telephone network and/or a data communications network (e.g., the internet 338).

The UE 310 includes a controller, such as a computer or a data processor (DP) 314, a computer-readable memory medium embodied as a memory (MEM) 316 that stores a program of computer instructions (PROG) 318, and a suitable wireless interface, such as radio frequency (RF) transceiver 312, for bidirectional wireless communications with the eNB 320 via one or more antennas.

The eNB 320 also includes a controller, such as a computer or a data processor (DP) 324, a computer-readable memory medium embodied as a memory (MEM) 326 that stores a program of computer instructions (PROG) 328, and a suitable wireless interface, such as RF transceiver 322, for communication with the UE 310 via one or more antennas.

The eNB 320 is coupled via a data/control path 334 to the NCE 340. The path 334 may be implemented as the S1 interface shown in FIG. 1. The eNB 320 may also be coupled to another eNB via data/control path 336, which may be implemented as the X2 interface shown in FIG. 1.

The NCE 340 includes a controller, such as a computer or a data processor (DP) 344, a computer-readable memory medium embodied as a memory (MEM) 346 that stores a program of computer instructions (PROG) 348.

At least one of the PROGs 318, 328 and 348 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 314 of the UE 310; by the DP 324 of the eNB 320; and/or by the DP 344 of the NCE 340, or by hardware, or by a combination of software and hardware (and firmware).

The UE 310 and the eNB 320 may also include dedicated processors, for example SRS scheduler 315 and SRS scheduler 325.

In general, the various embodiments of the UE 310 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 316, 326 and 346 may be of any type suitable to the local technical environment and may be implemented using any suitable data storage technology, such as semiconductor based memory devices, flash memory, magnetic memory devices and systems, optical memory devices and systems, fixed memory and removable memory. The DPs 314, 324 and 344 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 312 and 322) may be of any type suitable to the local technical environment and may be implemented using any suitable communication technology such as individual transmitters, receivers, transceivers or a combination of such components.

Figure 3:
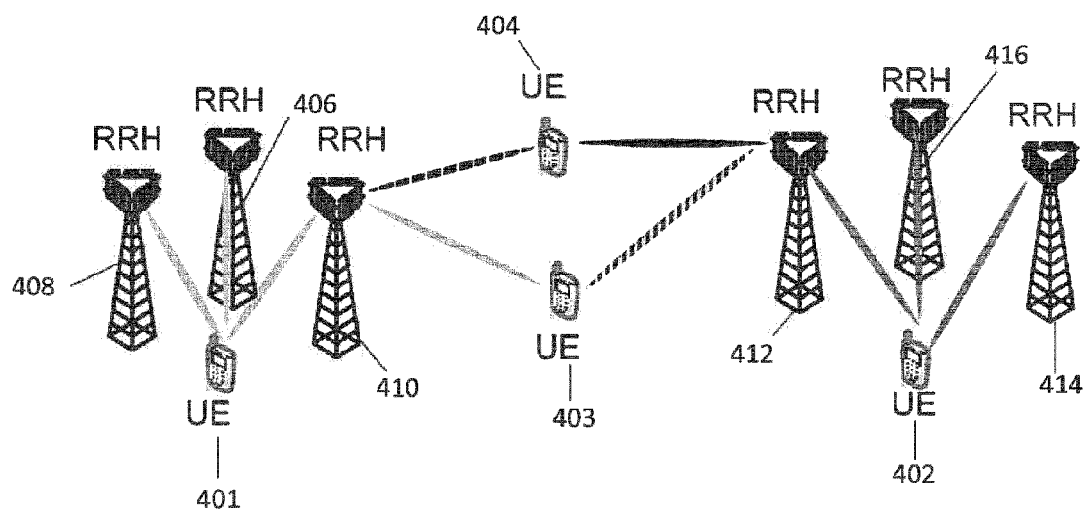
FIG. 3 illustrates a simplified diagram of CoMP transmissions.

Coordinated multi-point (CoMP) is a scheme to improve cell performance (e.g., in cell edge situations). FIG. 3 illustrates a simplified diagram of CoMP transmissions.

As shown, UE 401 is served by a first set of access points (e.g., RRH 406, RRH 408 and RRH 410). Likewise, UE 402 is served by a second set of access points (e.g., RRH 412, RRH 414 and RRH 416). UE 403 and UE 404 are served by access points from both sets (e.g., RRH 410 from the first set and RRH 412 from the second set). Each access point may be configured to receive SRS transmission on SRS resources. For example, transmission from UE 403 can be received by RRH 410 and RRH 412.

In various CoMP schemes, there is a need to balance the achieved gain and required CSI/CQI feedback. Timely and coordinated SRS transmission and reception may be used to obtain channel state information at cells to achieved average and cell edge throughput. Signaling may be used to enable a UE to probe the wireless channels of interfering cells (e.g., in a TDD system). The interfering cells take into account captured spatial information from coordinated SRS for downlink nulling weight design. In coordinated beamforming, spatial nulling may be created in the directions of the out of cell UEs transmitting SRS.

The term "cell" may also be used to describe a "cell/transmission point/access point", it should be understood that the disclosed approach can also be applied to various networks. Further, the SRS resources considered below can be provided on Rel-8/9/10 SRS resources, or through a DM RS.

To achieve spectral efficiency gain via CoMP, it is important for the eNBs to have timely and accurate channel state information from UEs. This can be achieved by requiring the UE to transmit SRS periodically. However, periodic SRS transmission by the UE has high overhead. To keep the overhead to an acceptable level, the UE may be required to transmit SRS less frequently. This reduces the usefulness of the CSI as the information may be outdated by the time of its application. To overcome these limitations, the UE can be implicitly asked to transmit SRS every time it receives a scheduling assignment. For instance, when a UE receives a downlink scheduling assignment in subframe n, it will expect a data transmission in subframe n+k. Prior to that data transmission, it will transmit an SRS in subframe n+k−d. This reduces SRS overhead while still providing timely and accurate CSI. This SRS transmission will be received by multiple eNBs, both within and outside of the CoMP set. These eNBs can then use the CSI to formulate an appropriate coordination strategy for the UE. For instance, eNBs within the CoMP set can use the CSI to perform coordinated beamforming to the UE. In addition, eNBs outside of the CoMP set can perform interference avoidance or nulling to minimize to the impact to this UE.

The use of predefined SRS transmission timing also reduces the coordination effort among eNBs. It is not necessary for the eNBs to be informed ahead of time of upcoming data transmissions to the UE. Instead, each eNB can monitor the SRS channel for UE transmission. When a SRS transmission is detected in subframe n+k−d, it may be tied to a data transmission in subframe n+k. This allows the eNB to modify its data transmissions in subframe n+k automatically. Thus, the required coordination among eNBs is minimized with the proposed scheme and the frequent information exchange among eNBs typical in conventional CoMP schemes can be avoided.

In each cell, SRS resources may be configured to receive SRS transmissions from UEs from other cells. A common SRS resource, in time and frequency, in a CoMP transmission set may be configured to facilitate the reception of in-cell and out-of-cell SRS transmissions. The SRS resources can be configured through X2/OAM. A CoMP transmission set may consist of various cells (e.g., cells A, B, C and D).

Figure 4:
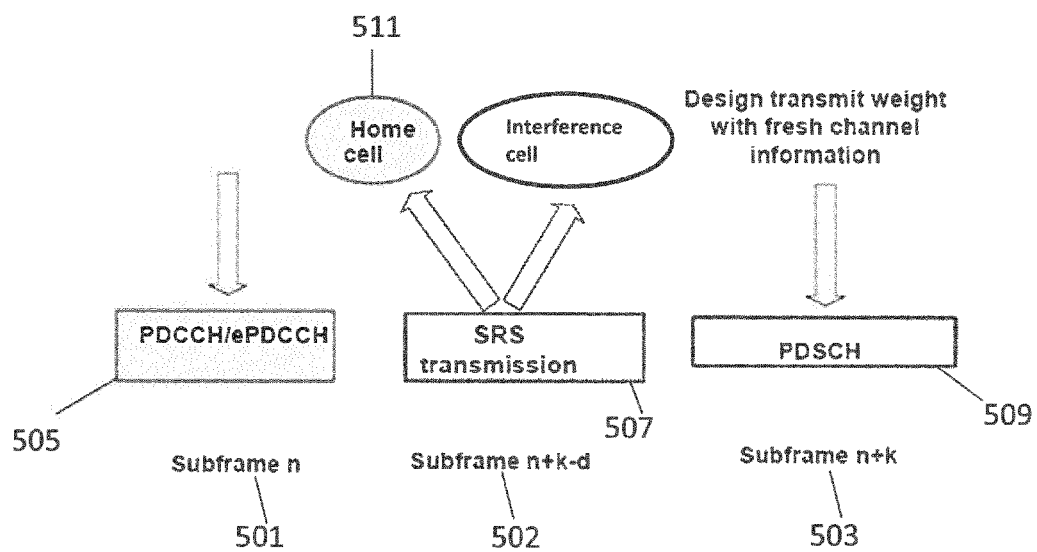
FIG. 4 shows an exemplary method for providing SRS in accordance with this invention.

As shown in FIG. 4, in a first subframe 501 (subframe n), the eNB A (of cell A) may inform a UE (e.g., UE A1) that the UE is to receive an assignment in a future subframe 503 (e.g., subframe n+k, where k is greater than 0) through a control channel (for example, it can be through a DCI transmitted on PDCCH or ePDCCH 505 which is the new downlink control channel to be standardized in LTE release-11 and/or later releases, etc.). The downlink control channel transmission from the eNB A may indicate SRS instructions implicitly. Alternatively, both SRS instructions and downlink assignments may be included in the downlink control channel. No matter whether the associated SRS transmission with the downlink assignment in the future (in subframe n+k) is indicated implicitly or explicitly, a deterministic timing relationship between uplink SRS transmission 507 and downlink PDSCH transmission 509 is assumed and established. In the downlink control channel, the MCS level of the PDSCH 509 may be determined with the most recent channel state information including those for the desired signal and interference. To account for the uncertainty in channel state or interference in subframe n+k, the downlink MCS can be chosen with a 'fudge factor' based on a success rate of past assignments.

The UE A1 may then transmit a SRS in a subframe 502 (e.g., subframe n+k−d where d is less than k) prior to the indicated subframe for PDSCH transmission (e.g., subframe n+k) on a SRS resource configured for other cell observation. As the SRS transmission from UE A1 targets other cells so they can acquire the spatial information of UE A1 with little coordination with the home cell of UE A1, the sounding from UE A1 may be conducted on sub-bands for the scheduled PDSCH transmission which will take place in subframe n+k. Both neighboring cells (e.g., eNB B, eNB C and eNB D) and the serving cell (e.g., eNB A) may receive the SRS transmission from the UE A1 Separate or common SRS regions may be used for SRS from a serving cell and other cells. The eNBs may, at each cell (e.g., at subframes n+k−d) conduct SRS reception on the in-cell resources and out-of-cell resources. The access points may then use this SRS reception for interference estimation at a later subframe, for example, a subframe with a deterministic time lag, such as d (e.g., on subframe n+k−d+d, or subframe n+k).

The neighboring cells may then design downlink weight based on a captured spatial signature for the SRS transmission by UE A1. The neighbor cells may also consider other UEs in the CoMP transmission set. The designed downlink weight is configured so that the interference to known UEs is minimized in relevant subframes (e.g., UE A1 in subframe n+k). A desired channel response at the home cell 511 may also be captured and used.

To trade off between processing latency budget, configuration flexibility and impact to implementation such as RF chain switching time, the deterministic timing relationship among downlink control channel (PDCCH or ePDCCH) transmission, UE SRS transmission, and downlink data (PDSCH) transmission can be conditional on the TDD downlink-uplink configuration, TDD special subframe configuration and the subframe index of the downlink control transmission. For example, for TDD downlink-uplink configuration 1, one set of {d,k} can be used when the downlink control is transmitted on subframe 0 (or 5), and another set of {d,k} is used when the downlink control is transmitted on subframe 1 (or 6), yet another can be used when the downlink control is transmitted on subframe 4 (9). Even on the same downlink-uplink configuration/special subframe configuration/downlink control subframe index, different sets of {d,k} are allowed for full flexibility in configuration.

The SRS bandwidth (BW) may be the same as the assigned downlink (DL) resource bearers (RBs). This saves on the SRS instruction and allow the other eNBs to perform better intercell interference coordination (ICIC). For example, coordinated beamforming (CB) or muting may be performed for only the assigned RBs and no coordination is needed for RBs not used. Additionally, an eNB can also coordinate with multiple cells.

Separate SRS regions may be used for SRS from a home cell and desired cells. Alternately, transmission combs can be used to separate desired and interfering signals at an eNB. Different cyclic shifts in SRS can be also used to set up resources for in-cell SRS transmission and out-of-cell SRS transmission.

The SRS transmission power at a UE may be used at cells to weight the spatial channel information properly. When coordination is possible among different cells, the eNBs may exchange information on SRS transmission power, transmission comb and cyclic shift of SRS transmissions from those UEs. This puts a burden to the network to establish a low latency link between eNBs, which has both implementation and standard implications. First the link should be low latency to provide value to the whole scheme. Second, except in a priopetary implementation, the SRS transmission power of UEs is not shared among eNBs. To enable that, and especially for a multi-vendor network, the X2 link between eNBs may be used to distribute the needed information, which involves standard modification.

In contrast to the drawbacks inherent to a tightly coupled network, a loosely coupled network may have no need for a low-latency broadband connection between eNBs. With a loosely coupled network, the eNBs may not need to exchange information on UEs' SRS transmission power. Additionally, the SRS power may be indicated implicitly by a UE selecting the SRS transmission resource. The SRS transmission power of a UE may be quantized. For example, a UE may be assigned two or more SRS resources, where each SRS resource is associated with a SRS transmission power. Depending on the measured pathloss (e.g., to the home cell and a dominant cell) a quantized transmission power may be used by the UE on the corresponding SRS resource. Then each cell may scale and combine the interference estimation from different SRS resources associated with different transmission power to get a summed interference estimation depending on the CoMP scheme used in the network.

The captured energy at SRS resources at an interfering cell may be contributed to by transmissions to/from other than SRSs. In one example, it can be a PUSCH transmission from UEs in other cells far away from the home cell which are not configured for coordinated SRS transmission/reception. The summed interference estimation can be adjusted according to the estimated power level for non-coordinated uplink transmissions. For example, the estimation of non-coordinated uplink transmission power can be conducted on SRS resources which are not configured for UEs to send SRS, and the estimated interference power level for non-coordinated uplink transmission can be subtracted from the captured energy at each SRS resource. Adjusting for the power due to non-coordinated transmission can ensure the summed interference estimation is at the right interference level seen by an eNB.

For example, a UE may be allowed to transmit at set/quantized power levels (e.g., p1 and p2 where p1 is greater than p2). There may be two SRS resources associated with the allowed power levels. In the CoMP transmission set, the SRS for transmissions at a first power level (e.g., p1) uses a given cyclic shift (e.g., a shift of 0-3) and the SRS for transmissions at another power level (e.g., p2) uses another cyclic shift (e.g., 4-7). Once a covariance matrix (e.g., R1) for the first power level region (e.g., with cyclic shift 0-3) is calculated, and a covariance matrix (e.g., R2) for the second power level region (e.g., with shift 4-7) is calculated, they can be scaled and added together for a cell to design the downlink weight. This avoids the need for exchanging transmission power information (e.g., through X2 signaling) between eNBs.

Figure 5:
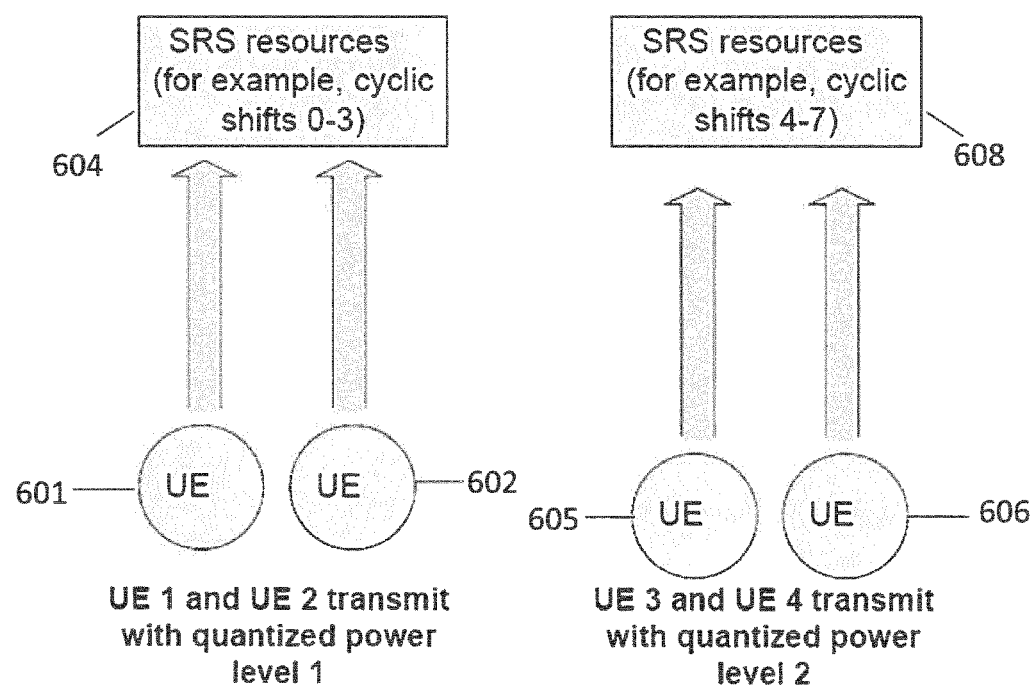
FIG. 5 shows exemplary SRS transmissions using quantized power levels in accordance with this invention FIG. 6 demonstrates the results of simulations using an exemplary method for providing SRS in accordance with this invention.

FIG. 5 shows exemplary SRS transmissions using quantized power level in accordance with this invention. Two UEs (UEs 601, 602) are configured to use a first SRS resource (SRS resource 604) with a first quantized power level. Two other UEs (UEs 605, 606) are configured to use a second SRS resource (SRS resource 608) with a second quantized power level.

Signaling may also be used for to override and/or cancel transmission (e.g., using PDCCH signaling). As above, at the first subframe (e.g., time n) the UE is informed of a future transmission (e.g., at subframe n+k). Then, at the time the future transmission is to occur (e.g., subframe n+k), the eNB may override the previous communication (e.g., to update MCS, accommodate retransmission, etc.). Therefore, if the UE receives another communication (e.g., a second PDCCH communication at subframe n+k) the UE may discard the previous communication (e.g., the first PDCCH communication). Additionally, a "cancel" command (e.g., using a PDCCH communication) may be used to cancel the transmission (e.g., due to higher priority traffic requiring the resources).

Figure 6:
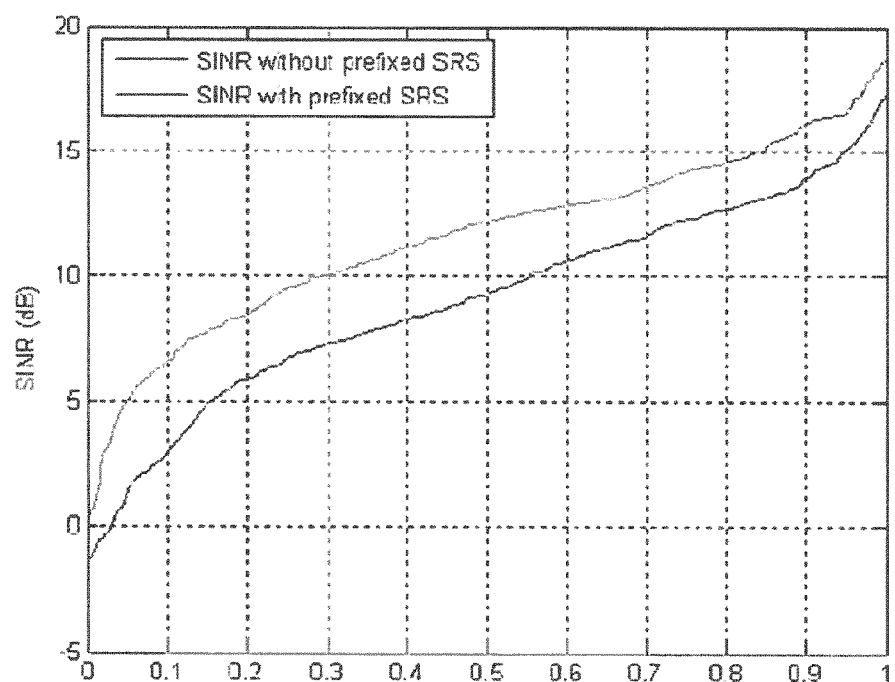

FIG. 6 demonstrates the results of simulations using an exemplary method for providing SRS in accordance with this invention. As shown, the signal to noise ratio (SINR) is higher when providing a SRS prior to a transmission as compared to the conventional techniques.

An exemplary embodiment in accordance with this invention are suitable for use in various networks. For example, a heterogeneous network (HetNEt) where multiple types of access points are in operation; and/or loosely coupled CoMP cells. Accordingly, these techniques are functional in existing systems and systems undergoing gradual improvements. The interference power at each SRS resource can be either summed or used separately, depending on SRS reception quality and the CoMP scheme used in the network, and whether the cell is in a UE's CoMP transmission set or not. A first non-limiting example is a coordinated beamforming CoMP scheme where, if the second cell is not in the CoMP transmission set of the first UE, the second cell chooses a precoder from a codebook or designs a transmit weight for its own UEs to minimize its interference to out-of-cell UEs as exemplified through the captured spatial information; however, if the second cell is in the CoMP transmission set of the first UE, the second cell chooses a precoder from a codebook or designs a transmit weight for its own UEs (including the first UE) to minimize its interference to out-of-cell UEs through the captured spatial information A second non-limiting example is a dynamic cell selection CoMP scheme where, the interference power captured at the SRS resources at the second cell is used to determine whether the second cell should be used in the transmission to the first UE. A third non-limiting example is a dynamic blanking CoMP scheme where, the interference power captured at SRS resources at the second cell is used to determine whether the second cell's transmission should be turned off to mitigate interference to the first UE.

Figure 7:
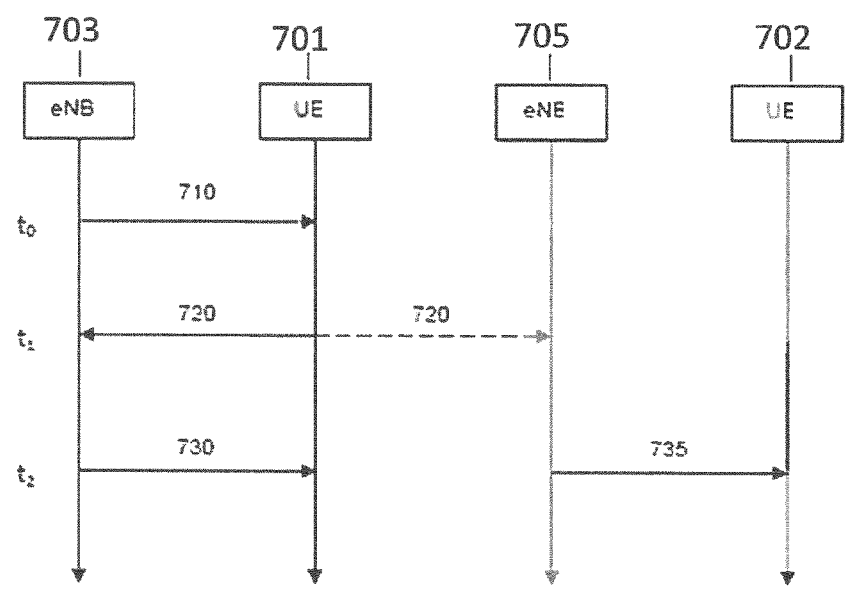
FIG. 7 shows a transmission diagram of an exemplary exchange in accordance with various exemplary embodiments of this invention.

FIG. 7 shows a transmission diagram of an exemplary exchange in accordance with various exemplary embodiments of this invention. At a first time ($t_0$), a first UE (UE 701) receives downlink control information 710 from a transmission from a first access point (eNB 703). At a second time ($t_1$) which comes at the second deterministic timing offset with respect to the first time, the UE 701 transmits SRS 720 at a quantized transmission power on its corresponding SRS resource. An uplink receiver (eNB 705) at a second cell captures spatial information from the transmission 720' by the UE 701. The captured spatial information is weighted according to the quantized SRS transmission power levels and summed. The eNB 705 chooses a transmission strategy depending on the CoMP scheme used in the network. At a third time ($t_2$), the eNB 703 transmits downlink data 730 to the UE 701. The transmission strategy from the eNB 703 to the UE 701 may be chosen or designed similarly as done in the second cell in order to minimize interference to out-of-cell UEs. Likewise, the eNB 705 may transmit downlink data 735 to a UE 702 in the second cell. As part of the process shown in FIG. 7 the eNB 705 may recognize the SRS being transmitted by the UE 701. It may then determine that eNB 703 will schedule data to UE 701 at time t2 using a beam that was formed based on UE 701 SRS transmission. Accordingly at time t2 the eNB 705 may transmit to UE 702 using weights that have been designed to minimize interference with eNB 703 data transmission to UE 701. Although not shown for the purposes of clarity in FIG. 7, it should also be appreciated that at time t1 the eNB 703 may capture an SRS being sent by UE 702 at time t1.

Based on the foregoing it should be apparent that the exemplary embodiments of this invention provide a method, apparatus and computer program(s) to provide sounding reference signals for coordinated multipoint transmissions.

Figure 8:
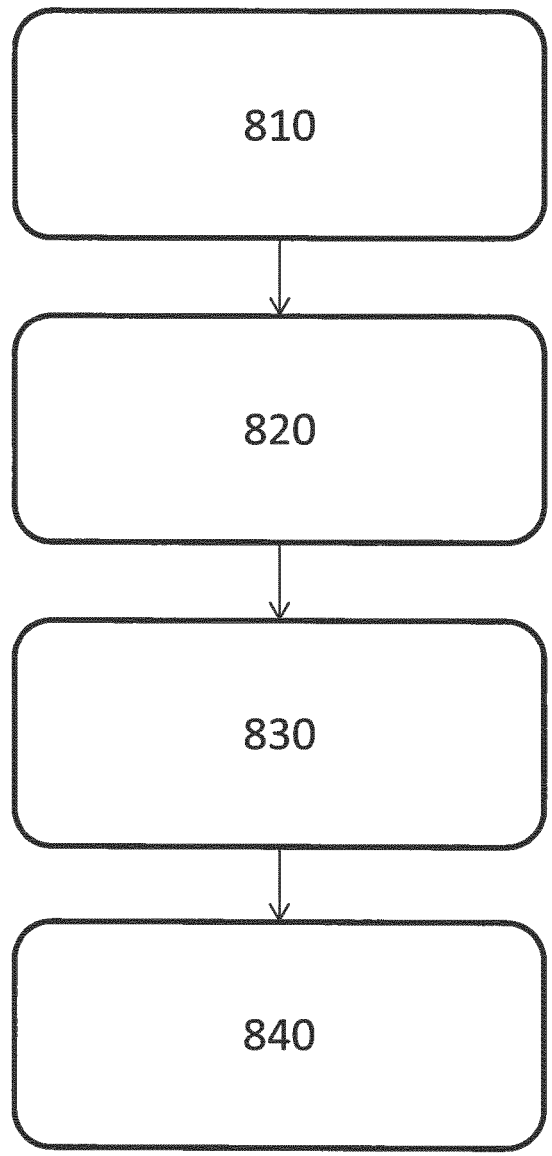
FIG. 8 is a logic flow diagram that illustrates the operation of an exemplary method, and a result of execution of computer program instructions embodied on a computer readable memory, in accordance with various exemplary embodiments of this invention.

FIG. 8 is a logic flow diagram that illustrates the operation of a method, and a result of execution of computer program instructions, in accordance with the exemplary embodiments of this invention. In accordance with these exemplary embodiments a method performs, at block 810, at a first time, a first UE reads downlink control information from a PDCCH/e-PDCCH transmission from a first cell. The downlink control information schedules a downlink data transmission (PDSCH) in the future with a first deterministic timing offset with respect to the read downlink control information. The first UE obtains an instruction from the read downlink control information or infers the request implicitly from the downlink control information for uplink SRS transmission in the future with a second deterministic timing offset with respect to the read downlink control information, the second deterministic timing offset is less than the first deterministic timing offset. At block 820, at a second time which comes at the second deterministic timing offset with respect to the first time, the first UE transmits SRS at a quantized transmission power to its corresponding SRS resource. At block 830, at the second time, an uplink receiver at a second cell captures spatial information from out-of-cell transmission on SRS resources corresponding to all quantized SRS transmission power levels. The captured spatial information is weighted according to the quantized SRS transmission power levels and summed. At block 840, at a third time which comes at the first deterministic timing offset with respect to the first time, the second cell chooses a transmission strategy depending on the CoMP scheme used in the network. At the third time, the first cell transmits the downlink data to the first UE. The transmission strategy from the first cell to the first UE is chosen or designed similarly as on the second cell to minimize its interference to out-of-cell UEs The various blocks shown in FIG. 8 may be viewed as method steps, and/or as operations that result from operation of computer program code, and/or as a plurality of coupled logic circuit elements constructed to carry out the associated function(s).

Figure 9:
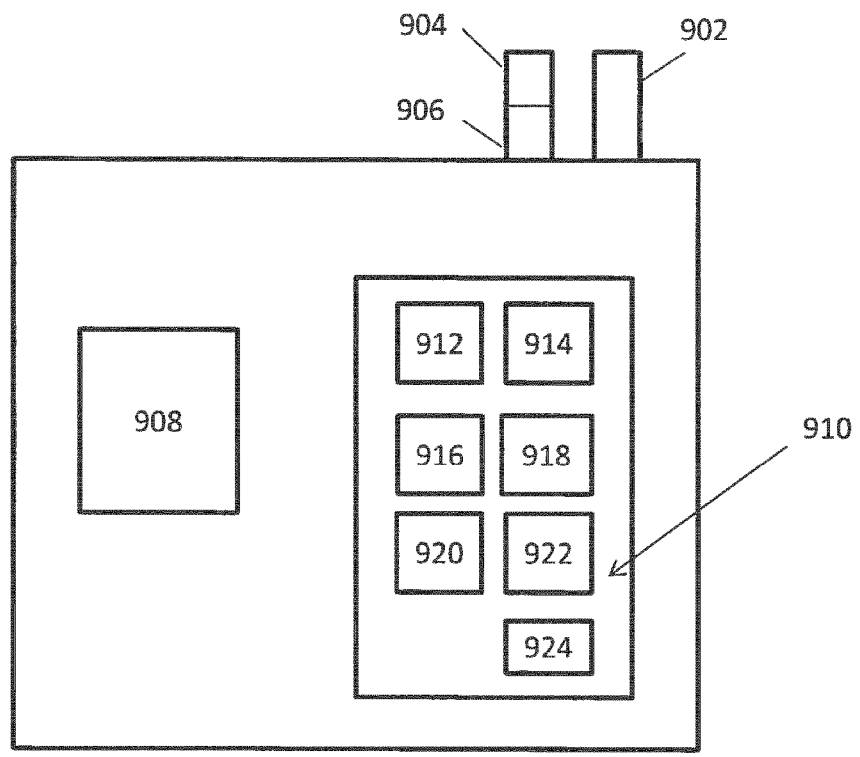
FIG. 9 shows an exemplary apparatus comprising means suitable for use in practicing various exemplary embodiments of this invention.

The apparatus for carrying out the described method may comprise various means, as shown schematically in FIG. 9. The apparatus is shown generally at 901. The apparatus comprises sending means 902. The sending means may be utilized for sending/transmitting information such as a scheduling assignment; downlink data packet transmissions; SRS transmissions; SRS power information; a cyclic shift for the SRS.

The apparatus also comprises receiving means 904. The receiving means may be utilized for receiving SRS transmissions. The receiving means 904 may also comprise means 906 for separating a received SRS transmission using a transmission comb.

Although sending means 902 and receiving means 904 have been shown in FIG. 9 as separate means, they may alternatively be combined into a single means such as transceiver means.

The apparatus also comprises memory means 908 and processor means 910. Processor means 910 may comprise further means. These may include means for estimating SRS resources 912; means for choosing a transmission strategy 914; means for designing a downlink transmit weight 916; means for choosing a precoder from a codebook 918; means for designing beamforming weights 920; means for determining whether to cancel a scheduling assignment 922; means for informing a UE that a scheduling assignment has been cancelled 924 (this may be in combination with sending means 902).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names assigned to different channels (e.g., PDCCH, ePDCCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
    sending, from a first access point, a scheduling assignment to a first user equipment at a first time;
    receiving, at the first access point, a reference signal transmission from the first user equipment at a second time;
    estimating, at the first access point at the second time, reference signal resources, over which the reference signal transmission from a second user equipment in a second access point is transmitted,
    wherein the reference signal transmission is associated with the downlink data packet transmission from the second access point at the third time;
    choosing a transmission strategy for use at the third time based at least in part on the estimated reference signal resources; and
    sending, from the first access point, a downlink data packet transmission to the first user equipment at a third time.

2. The method of claim 1, where, in coordinated beamforming coordinated multipoint transmission, the received reference signal transmission is used to one of:
    design a downlink transmit weight; and
    choose a precoder from a codebook.

3. The method of claim 1, where, in dynamic access point selection coordinated multipoint transmission, the reference signal transmission is used in coordination with reference signal reception at other access points in a coordinated multipoint transmission set to choose a transmission access point to serve at least one other user equipment at the third time.

4. The method of claim 1, where, in dynamic blanking coordinated multipoint transmission, the reference signal transmission is used in coordination with reference signal reception at other access points in a coordinated multipoint transmission set to determine whether the second access point should transmit to at least one other user equipment at the third time,
    wherein the coordinated multipoint transmission set comprises the second access point.

5. The method of claim 1, wherein the reference signal transmission is used to design beamforming weights.

6. The method of claim 5, wherein the beamforming weights generate spatial nulling in a direction towards the first user equipment.

7. The method of claim 1, wherein reference signal transmissions from user equipment associated with the first access point use a first time and/or frequency region and reference signal transmissions from user equipment not associated with the first access point use a second time and/or frequency region.

8. The method of claim 1, further comprising sending, from the first access point to a second access point, reference signal power information and a cyclic shift for the reference signal.

9. An apparatus, comprising:
    at least one processor; and
    at least one memory including computer program code, the at least one memory and the computer program code configured to, with the at least one processor, cause the apparatus to perform at least the following:
    send a scheduling assignment to a first user equipment at a first time;
    receive a first reference signal transmission from the first user equipment at a second time;
    estimate, at the second time, reference signal resources, over which a second reference signal transmission from a second user equipment associated with a second access point is received,
    wherein the second reference signal transmission is associated with a second downlink data packet transmission from a second apparatus at the third time;
    choose a transmission strategy for use at the third time based at least in part on the estimated reference signal resources; and
    send a first downlink data packet transmission to the first user equipment at a third time.

10. The apparatus of claim 9, where, in coordinated beamforming coordinated multipoint transmission, the second reference signal transmission is used to one of:
    design a downlink transmit weight; and
    choose a precoder from a codebook.

11. The apparatus of claim 9, wherein the at least one memory and the computer program code are further configured to cause the apparatus to design beamforming weights based on the second reference signal transmission.

12. The apparatus of claim 11, wherein the beamforming weights generate spatial nulling in a direction towards the second user equipment.

13. The apparatus of claim 9, wherein reference signal transmissions from user equipment associated with the first access point use a first time and/or frequency region and reference signal transmissions from user equipment not associated with the first access point use a second time and/or frequency region.

14. The apparatus of claim 9, wherein the at least one memory and the computer program code are further configured to cause the apparatus to send, to a second access point, reference signal power information and a cyclic shift for the first reference signal.

15. The apparatus of claim 9, wherein the apparatus comprises one of an access point and a base station.

16. A computer program embodied on a non-transitory computer readable medium, comprising computer executable instructions which when run on one or more processors perform the method of claim 1.

17. The apparatus of claim 9, wherein the memory and computer program code are configured such that, in dynamic access point selection coordinated multipoint transmission, the reference signal transmission is used in coordination with reference signal reception at other access points in a coordinated multipoint transmission set to choose a transmission access point to serve at least one other user equipment at the third time.

18. The apparatus of claim 9, wherein the memory and computer program code are configured such that, in dynamic blanking coordinated multipoint transmission, the reference signal transmission is used in coordination with reference signal reception at other access points in a coordinated multipoint transmission set to determine whether the second access point should transmit to at least one other user equipment at the third time, wherein the coordinated multipoint transmission set comprises the second access point.

\* \* \* \* \*